United States Patent
Hein et al.

(10) Patent No.: US 7,274,755 B2
(45) Date of Patent: Sep. 25, 2007

(54) RECEIVER

(75) Inventors: Werner Hein, Munich (DE); Johann Steger, Munich (DE); Michael Weber, Freising (DE)

(73) Assignee: Infineon Technologies AG, Munich (DE)

( * ) Notice: Subject to any disclaimer, the term of this patent is extended or adjusted under 35 U.S.C. 154(b) by 743 days.

(21) Appl. No.: 10/457,160

(22) Filed: Jun. 9, 2003

(65) Prior Publication Data

US 2004/0037329 A1     Feb. 26, 2004

Related U.S. Application Data

(63) Continuation of application No. PCT/EP01/14548, filed on Dec. 11, 2001.

(30) Foreign Application Priority Data

Dec. 18, 2000   (DE) ................ 100 63 078

(51) Int. Cl.
*H03K 9/00*     (2006.01)
*H04L 27/00*    (2006.01)

(52) U.S. Cl. .................................... 375/316
(58) Field of Classification Search ............... 375/316, 375/224, 285, 340, 346; 714/100, 48, 709, 714/699, 748, 799
See application file for complete search history.

(56) References Cited

U.S. PATENT DOCUMENTS 5,502,713 A * 3/1996 Lagerqvist et al. ......... 370/252
6,130,915 A * 10/2000 Hallier et al. ............... 375/260
6,201,837 B1 * 3/2001 Okamoto .................... 375/316
6,498,805 B1 * 12/2002 Brown et al. ............... 375/147
7,068,619 B2 * 6/2006 Balachandran et al. ..... 370/328

FOREIGN PATENT DOCUMENTS

DE   195 35 358 C1   3/1997
DE   196 26 132 A1   1/1998
EP    0 938 207 A2   8/1999

OTHER PUBLICATIONS

Sun et al., "Adaptive Two-level Unequal Error Protection Convolutional Code Scheme for Wireless ATM Networks," IEEE (Japan), p. 1693-1697, (Jul. 2000).
Sun et al., "DLC Strategies with Flexible Error Control in Wireless ATM," IEEE (Japan), p. 90-94, (Jul. 2000).

* cited by examiner

*Primary Examiner*—Jean B. Corrielus
(74) *Attorney, Agent, or Firm*—Jenkins, Wilson, Taylor & Hunt, P.A.

(57) ABSTRACT

Receiver for Receiving Data Frames. According to one aspect, a receiver for receiving data frames which contain information data includes a signal input. Further, the receiver includes a data frame separator circuit for separating the signaling data from the information data. A switching device connects the data present at current input to a data output. A channel decoding circuit decodes the data which is present and generates signals which indicate whether the decoding has been carried out correctly. When correct decoding has taken place, a control circuit buffers all data and outputs a signal to the switching device to connect the buffered information data to the channel decoding circuit. When the signal indicates the correct decoding is received, the control circuit outputs the decoded information data.

22 Claims, 5 Drawing Sheets

RECEIVER

RELATED APPLICATIONS

This application is a continuation of PCT patent application No. PCT/EP01/14548, filed Dec. 11, 2001, which claims priority to German patent application number 10063078.2, filed Dec. 18, 2000, the disclosures of each of which are incorporated herein by reference in their entirety.

TECHNICAL FIELD

The invention relates to a receiver for receiving data frames which contain information data and signaling data, in particular an EGPRS receiver for a mobile telephone.

BACKGROUND ART

FIG. 1 is a schematic view of a mobile telephone having a receiver E and a transmitter S which are connected to an antenna A. The mobile telephone receives, from a base station, data frames (frames F) which are output by the receiver E for further data processing by a downstream data processing unit DV. The transmission channel for transmitting the data frames is exposed under certain circumstances to severe interference, in particular in the case of mobile radio telephony so that the data frames F are, under certain conditions, received in a highly falsified state by the mobile telephone. If the decoding of the received data frame F reveals that it is errored, the mobile telephone transmits an automatic request signal ARQ to the base station for the renewed transmission of the data frame F.

FIG. 2 shows a flowchart of the ARQ2 method such as is used in EGPRS receivers according to the prior art. GPRS (=general packet radio service) refers to data transmission according to X.25 standard using GSM (GSM: Global System for Mobile Communications). EGPRS receivers are GPRS receivers using what is referred to as the EDGE modulation method.

In a step S1 the data frames F are received by the mobile telephone by means of a radio frequency receiver and a demodulator.

Then, in a step S2, the channel equalization of the received data frame is carried out by means of an equalizer.

The received data frame contains signaling data and information data. In a step S3, the signaling data and the information data are separated from one another by means of a separator circuit of the receiver E. The received signaling data contains here a data frame identifier and a decoder instruction for the decoding of the respective information data.

In a step S4, the separated-off received signaling data is decoded by means of a channel decoding circuit, the decoded signaling data containing the decoding instruction for decoding the respective information data.

In a step S5, the channel decoding circuit checks whether or not the decoding of the signaling data has taken place without error.

If the decoding of the received signaling data has not been carried out without error [lacuna] the channel decoding circuit, the sequence returns to step S1 and the next received data frame F is processed.

If conversely it is determined in step S5 that the decoding of the signaling data has been carried out without error by the channel decoding circuit, the received information data and the decoding instruction, contained in the decoded signaling data, for the decoding of the received information data are stored in a system memory of a baseband control unit in a step S6 by means of a memory controller of an RLC/MAC control circuit.

In a step S7, the RCL/MAC control circuit uses its memory controller to search through all the buffered received information data which has the same packet number or data frame identifier, and reads the latter out of the system memory. The read-out information data is fed to an information data decoder for the decoding of the information data in accordance with the decoding instruction.

In a step S8, the read-out information data is decoded by the information data decoder in accordance with the decoding instruction for the decoding of the information data. For this purpose, the information data decoder receives the corresponding information data decoding instruction from a data decoding controller contained in the RLC/MAC control circuit. The RLC/MAC control circuit receives, for its part, the decoding instruction for the decoding of the information data from a signaling data decoder.

In a step S9, the information data decoder checks whether or not the decoding of the information data has taken place without error, and outputs a corresponding indicator signal to the RLC/MAC control circuit.

If the decoding of the information data has been carried out without error by the information data decoder, the RLC/MAC control circuit outputs a control signal to the information data decoder for the transmission of the decoded information data to a downstream LLC circuit (LLC: Logic Link Control). At the same time, all the information data buffered in the system memory together with the associated data frame identifier or packet number is cleared from the RLC memory area of the system memory.

If, in step S9, the information data decoder detects that the decoding of the information data has not taken place without error, the information data which has been decoded in an errored fashion is not transmitted to the downstream LLC circuit, and the received [lacuna]. The information data buffered in the system memory is not cleared from the RLC memory area of the system memory and remains in the memory. In addition, the RLC/MAC control circuit outputs a control signal to the transmitter of the mobile telephone, which transmitter requests the incorrectly decoded data frame again with the respective data frame identifier by means of a request signal (ARQ) which has been output to the base station.

The process then returns to step S1.

FIG. 3 shows an EGPRS receiver according to the prior art, in which the ARQ2 method illustrated in FIG. 2 is carried out. The receiver has an antenna A for receiving the transmitted data frames, and a downstream signal conditioning circuit. In the signal conditioning circuit, the data frames which have been transmitted in analog form are demodulated by means of an RF demodulation circuit and are fed to a downstream analog bandpass filter bank for frequency band selection. An analog/digital converter for converting the demodulated data frames and digital data frames is connected downstream of the bandpass filter bank.

The digital data frames are fed to a digital equalizer for equalizing the data which is transmitted on the transmission channel.

At the output end, a data separator circuit which separates the signaling data contained in the data frame from the information data which is also contained in the data frame is connected downstream of the equalizer. The signaling data is fed via the separator circuit to a signaling data decoder via data lines. The signaling data decoder, the data separator circuit and the equalizer are integrated into a digital signal processor (DSP) here. The signaling data decoder decodes the received signaling data in accordance with a predefined decoding instruction for the decoding of signaling data and outputs the decoded signaling data to the RLC/MAC control circuit via data lines. At the same time, the signaling data decoder determines whether or not the decoding of the signaling data has taken place without error. This determination is made by means of redundant data which is contained in the signaling data. Via a control line, the signaling data decoder outputs, to the RLC/MAC control circuit a corresponding indicator signal which indicates the error-free or errored decoding of the signaling data of a data frame.

If the indicator signal which is received by the signaling data decoder indicates that the decoding of the signaling data has taken place without error, the information data—separated off by the separator circuit—of the associated data frame and the decoded decoding instruction for decoding the information data are written into the RLC memory area of the system memory by the memory controller of the RLC/MAC control circuit. Then, the memory controller of the RLC/MAC control circuit searches through all the buffered information data which is associated with the data frame with the same data frame identifier and is located in the RLC memory area of the system memory, and reads this information data out from the system memory. The read-out information data is fed via data lines to the information data decoder of the baseband control unit. The information data decoder decodes all the supplied information data which has the same frame identifier. In the process, the information data decoder checks whether or not the decoding of the information data has taken place without error with respect to the data instruction, supplied by the data decoder/control circuit, for the decoding of information data. The information data decoder outputs an indicator signal to the data decoder controller of the RLC/MAC control circuit via an indicator line, which indicator signal indicates whether or not the decoding of the information data has taken place successfully. If the received indicator signal indicates that the decoding of the information data by the information data decoder has been terminated successfully, the data decoding controller outputs a control signal to the information data decoder, by means of which control signal the information data decoder receives the instruction to pass on the decoded information data to the downstream LLC block. In addition, the memory controller of the RLC/MAC control circuit outputs a control signal to the system memory by means of which the information data which is buffered in the RLC memory area and which has been decoded without error by the information data decoder is cleared.

If, conversely, the indicator signal which has been output by the information data decoder indicates that the information data of the data frame has not been decoded without error, the data decoding controller outputs a control signal to the information data decoder which prevents the information data which has been decoded in an errored fashion from being passed on to the downstream LLC block. The encoded information data which is buffered in the RLC memory area and which has not been successfully decoded by the information data decoder is not cleared. In addition, the RLC/MAC control circuit outputs a control signal to a transmitter which sends off a request signal ARQ to the base station to request the renewed transmission of the data frame.

The receiver according to the prior art which is shown in FIG. 3 has a signaling data decoder which is integrated into the DSP processor, and an information data decoder which is integrated into the baseband control unit. The signaling data decoder and the information data decoder are provided for decoding different data, namely on the one hand decoding signaling data and on the other hand decoding information data, but the functionality of the two decoders in terms of circuitry is the same. However, the expenditure on circuitry to implement the signaling data decoder and the information data decoder is very high.

The disadvantage of the circuit arrangement according to the prior art which is illustrated in FIG. 3 is that two data decoders have to be provided, and the expenditure in terms of circuitry for the receiver is thus very high overall.

SUMMARY OF THE INVENTION

The object of the present invention is therefore to provide a receiver for receiving data frames which can be implemented with low expenditure in terms of circuitry.

This object is achieved according to the invention by means of a receiver having the features specified in Patent claim 1.

The invention provides a receiver for receiving data frames which each contain information data and signaling data, the signaling data comprising a data frame identifier and a decoding instruction for decoding the associated information data, having a signal input for receiving the data frames which are transmitted on a transmission channel, a data frame separator circuit for separating the signaling data from the information data, a controllable switching device which, as a function of a control signal, connects through the signaling data present at a first data input of the switching device or the information data present at a second data input of the switching device to a data output of the switching device, a channel decoding circuit, connected to the data output of the switching device, for decoding the data which is present, the channel decoding circuit generating indicator signals which indicate whether the decoding of the data which is present has been carried out without error by the channel decoding circuit, and having a control circuit, in which case, when a first indicator signal which indicates the error-free decoding of the signaling data of a data frame by the channel decoding circuit is received, the control circuit buffers the information data, the decoding instruction and the data frame identifier in a memory and outputs a control signal to the switching device in order to connect through the buffered information data to the channel decoding circuit, in which case, when a second indicator signal which indicates the error-free decoding of the information data by the channel decoding circuit is received, the control circuit outputs the decoded information data to a downstream data processing unit for further data processing.

The basic idea of the present invention is to provide only a single channel decoding circuit which carries out both the decoding of the signaling data and the decoding of the information data.

As a result, when the receiver according to the invention is implemented, it is possible, in comparison with the previous receiver, to dispense with a decoding circuit and thus to considerably reduce the expenditure on circuitry.

The data frames are received by means of the receiver according to the invention, preferably over a mobile radio link.

The signal input of the receiver according to the invention is preferably connected here to a reception antenna for receiving the transmitted data frames. The data frames are preferably modulated in analog form.

Preferably, an RF demodulator for demodulating the received data frames is connected to the reception antenna.

The RF demodulator is preferably a PSK demodulator.

Preferably an analog bandpass filter bank for frequency band selection is connected downstream of the RF demodulator of the receiver according to the invention.

Preferably an analog/digital converter for converting the demodulated data frames into digital data frames is connected downstream of the analog bandpass filter bank.

Preferably an equalizer for equalizing the data which is transmitted on a transmission channel is connected downstream of the analog/digital converter.

Preferably a data frame separator circuit for separating the signaling data from the information data is connected downstream of the equalizer.

In a preferred embodiment, the data frame separator circuit has a first data output for outputting the signaling data and a second data output for outputting the information data.

In a first embodiment of the receiver according to the invention, the second data output of the data frame separator circuit is connected to a buffer for buffering the separated-off information data.

The buffer is preferably connected here to the second data input of the controllable switching device.

The first data output of the data frame separator circuit is preferably connected to the first data input of the controllable switching device.

In one preferred embodiment of the receiver according to the invention, the equalizer, the data frame separator circuit, the controllable switching device and the channel decoding circuit are integrated into a digital signal processor.

In a first embodiment of the receiver according to the invention, the buffer is additionally integrated into the digital signal processor.

In the first embodiment of the receiver according to the invention, the control circuit is composed of a first control unit which is integrated into the digital signal processor, and of a second control unit which is integrated into a baseband control unit, in which case the first control unit receives the first indicator signal from the channel decoding circuit which is integrated into the digital signal processor, and drives, as a function of the first indicator signal, the controllable switching device and the buffer which is also integrated into the digital signal processor, in which case the second control unit outputs, as a function of the second indicator signal which is generated by the channel decoding circuit integrated into the digital signal processor, the decoded information data to an LLC circuit which is integrated into the baseband control unit.

The first control unit which is integrated into the digital signal processor in the first embodiment of the receiver according to the invention preferably has a memory controller for driving the buffer which is also integrated into the digital signal processor.

In a second preferred embodiment of the receiver according to the invention, the control circuit is integrated into the baseband control unit.

The control circuit which is integrated into the baseband control unit preferably buffers here the information data which is output by the data separator circuit, the decoding instruction for decoding the information data, and the data frame identifier in a system memory which is also integrated into the baseband control unit, the buffering being carried out by the integrated control circuit as a function of a first indicator signal which is output by the channel decoding circuit which is integrated into the digital signal processor and which indicates the error-free decoding of the signaling data by the channel decoding circuit.

The control circuit which is integrated into the baseband control unit in the second preferred embodiment of the receiver according to the invention drives, preferably as a function of the first indicator signal, the switching device— integrated into the digital signal processor—in such a way that it connects through the buffered information data to the channel decoding circuit which is also integrated into the digital signal processor.

In the second preferred embodiment of the receiver according to the invention, the baseband control unit of the integrated control circuit has a memory controller for driving the system memory which is also integrated into the baseband control unit.

Here, the control circuit which is integrated into the baseband control unit outputs the decoded information data to an LLC circuit—integrated into the baseband control unit—as a function of the second control signal which is output by the channel decoding circuit which is integrated into the digital signal processor and which indicates the error-free decoding of the information data by the channel decoding circuit.

The channel decoding circuit of the receiver according to the invention decodes, as a function of a control signal received by the control circuit, the data which is present, in accordance with a first decoding instruction for decoding signaling data or in accordance with a second decoding instruction for decoding information data.

In a preferred embodiment, the channel decoding circuit receives the decoding instruction from the control circuit via control lines.

The receiver according to the invention is preferably an EGPRS receiver.

In a particularly preferred embodiment, the receiver according to the invention is installed in a mobile telephone.

In one alternative embodiment of the receiver according to the invention, the signal input of the receiver is connected to a signal line in order to receive transmitted data frames.

Preferred embodiments of the receiver according to the invention are described below with reference to the appended figures in order to explain features which are essential to the invention.

DETAILED DESCRIPTION OF THE INVENTION

Figure 4:
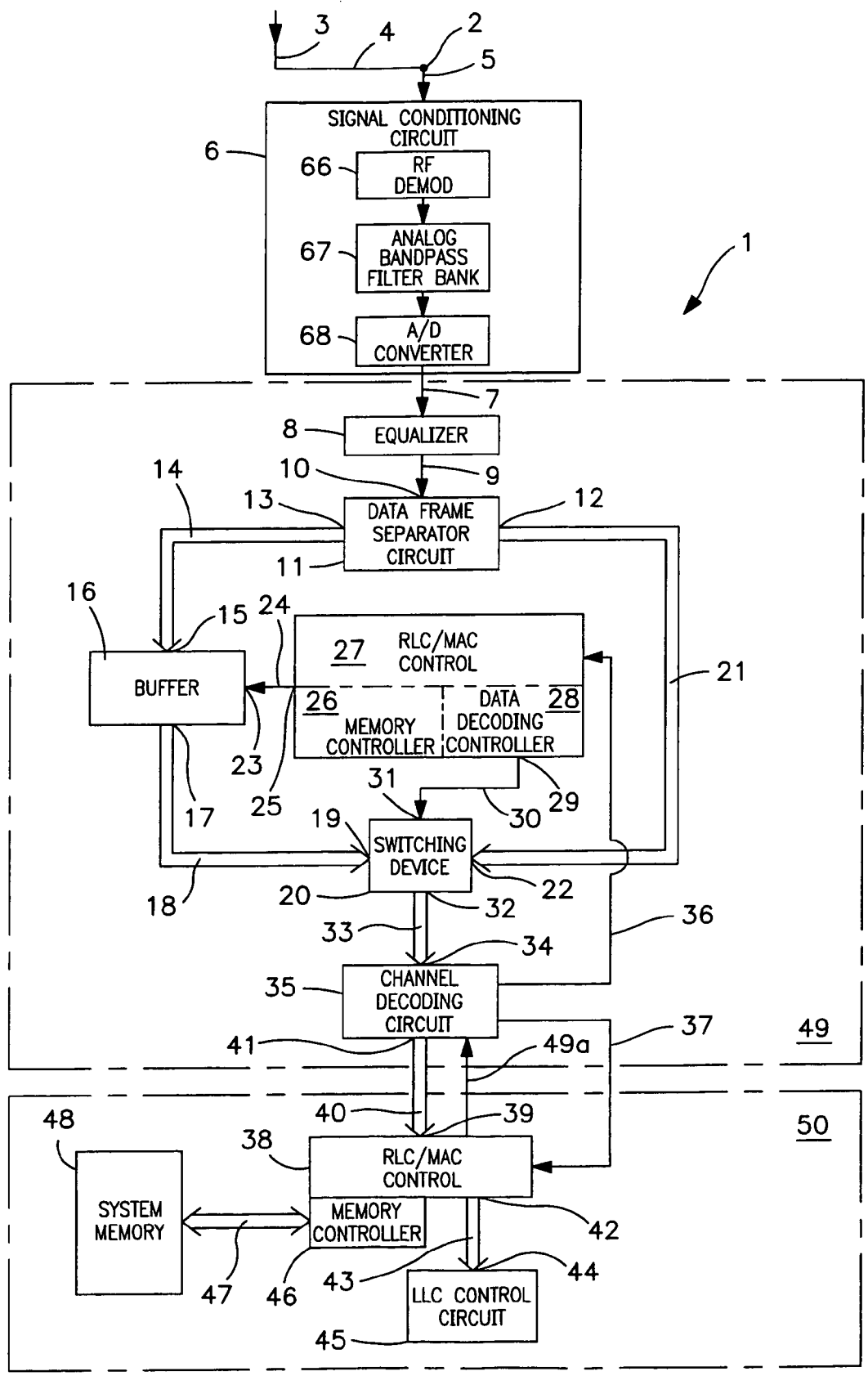
FIG. 4 shows a first embodiment of the receiver according to the invention.

FIG. 4 represents a first embodiment of the receiver according to the invention. The receiver 1 has a signal input 2 for receiving data frames which are transmitted on a transmission channel. In the example shown in FIG. 4, the data frames are transmitted from a base station over a mobile radio link and are received by an antenna 3 of a mobile radio telephone which contains the receiver 1 illustrated in FIG. 4. The signal input 2 of the receiver 1 is connected via a signal line 4 to the reception antenna 3. The data frames which are received via the signal input 2 of the receiver 1 contain information data and signaling data. Here, the signaling data comprises a data frame identifier or data number and a decoding instruction for decoding the associated information data which is contained in the data frame.

The received data frames are data frames which are modulated in analog form and are fed from the analog signal input 2 of the receiver according to the invention to a signal conditioning circuit 6 via a signal line 5. The signal conditioning circuit 6 contains an RF demodulator for demodulating the received data frames. The RF demodulator is preferably a PSK demodulator. In addition, the signal conditioning circuit 6 contains an analog bandpass filter bank which is connected downstream of the RF modulator and has the purpose of selecting the frequency band of the received signal. The analog bandpass filter bank is connected at the output end to an analog/digital converter for converting the demodulated data frames into digital data frames.

The demodulated digital data frames are output by the signal conditioning circuit 6 via a line 7 to an equalizer 8 which is provided for equalizing the data transmitted on the transmission channel. The equalized digital data frames are output by the equalizer 8 to a data input 10 of a data frame separator circuit 11 via a line 9. The data frame separator circuit 11 has a first data output 12 for outputting the separated-off signaling data of the data frame and a second data output 13 for outputting the separated-off information data of a supplied digital data frame. The data frame separator circuit 11 separates the data frame which is present at the data input 10 into signaling data and into associated information data. The information data is output to a data input 15 of a buffer 16 by the second data output 13 of the data frame separator circuit 11 via data lines 14. The buffer 16 has a data output 17 which is connected via data lines 18 to a data input 19 of a controllable switching device 20.

The first data output 12 of the data frame separator circuit 11 is directly connected to a further data input 22 of the controllable switching device 20 via data lines 21. The buffer 16 is provided for buffering the information data which is output by the data frame separator circuit 11. The buffer 16 has a control input 23 which is connected via a control line 24 to a control output 25 of a memory controller 26 which is contained in an RLC/MAC control circuit 27. The RLC/MAC control circuit 27 also contains a data decoding controller 28 which is connected to a control input 31 of the switching device 20 via a control output 29 and a control line 30. The memory controller 26 of the RLC/MAC control circuit 27 controls the buffer 16, and the data decoding controller 28 of the RLC/MAC control circuit 27 controls the switching over between the two data inputs 19, 22 of the controllable switching device 20. The controllable switching device 20 has a data output 32 which is connected via data lines 33 to a data input 34 of a channel decoding circuit 35. As a function of the control signal which is output by the decoding controller 28, either the information data which is present at the data input 19 of the switching device 20 and which is read out from the buffer 16 or the information data which is present at the other data input 22 is connected through to the data output 32 of the switching device 20, and thus to the data input 34 of the downstream channel decoding circuit 35.

When a data frame is received, the data input 22 of the switching device 20 is firstly connected through to the data output 32 so that the signaling data which is separated off from the data frame separator circuit is connected through to the channel decoding circuit. The associated information data which is separated off by the data frame separator circuit 11 is buffered in the buffer 16 under the control of the memory controller 26. The channel decoding circuit 35 carries out decoding of the signaling data present at the input 34 and checks, by reference to redundant data which is contained in the signaling data, whether or not the decoding has taken place without error. The channel decoding circuit 35 outputs, via a signaling line 36, a first indicator signal to the RLC/MAC control circuit 27 which indicates whether the decoding of the signaling data of the received data frame has been carried out without error or successfully by the channel decoding circuit 35.

If the signaling data has not been decoded successfully or without error by the channel decoding circuit 35, the next data frame is processed by the receiver 1 and the memory controller 26 drives the buffer 16 in such a way that the information data of the next data frame is written into the buffer 16. If, conversely, the indicator signal transmitted via the signal line 36 indicates that the decoding of the signaling data has been carried out without error by the channel decoding circuit 35, the information data—buffered in the buffer 16—of the associated data frame is connected through to the channel decoding circuit 35 via the data lines 18, 33 by driving the switching device 20 which can be switched over. The channel decoding circuit 35 carries out decoding of the connected-through information data by means of a decoding instruction for decoding the supplied information data. The decoding instruction which has been acquired during the decoding of the signaling data is used here. The channel decoding circuit 35 carries out the decoding of the information data and checks, by means of redundant data, whether or not the decoding of the information data has been carried out without error. Via a signaling line 37, the channel decoding circuit 35 outputs, to a further RLC/MAC control circuit 38, a corresponding second indicator signal which indicates the error-free decoding of the information data. The RLC/MAC control circuit 38 has a data input 39 which is connected via data lines 40 to a data output 41 of the channel decoding circuit 35. In addition, the RLC/MAC control circuit 35 is connected via a data output 42 and data lines 43 to a data input 44 of a downstream LLC control circuit 45. The RLC/MAC control circuit 38 contains a memory controller 46 which is connected via data and control lines 47 to the system memory 48. Furthermore, the RLC/MAC control circuit 38 drives the channel decoding circuit 35 via control lines 49*a*.

If the second indicator signal which is transmitted via the signaling line 37 indicates that error-free decoding of the information data has been carried out by the channel decoding circuit 35, the RLC/MAC control circuit 38 passes on the decoded information data present at the data input 29 via the data output 42 and the data lines 43 to the data input 44 of the downstream LLC circuit 45 for further data processing.

If the second indicator signal which is present on the signaling line 37 indicates conversely that the decoding of the information data has not been carried out without error or has failed, the decoded information data which is present at the signal input 39 is not passed on to the downstream LLC block 45 by the RLC/MAC control circuit 38 and is rejected. The associated information data remains in the buffer 16, and the RLC/MAC control circuit 38 outputs a control signal to a transmitter which is contained in the receiver 1 and which transmits a request signal to the base station for the renewed transmission of that data frame whose decoding has failed.

In the first embodiment illustrated in FIG. 4, the equalizer 8, the data frame separator circuit 11, the buffer 16, the first RLC/MAC control circuit 27, the controllable switching device 20 and the channel decoding circuit 35 are integrated into a digital signal processor 49 (DSP). In contrast, the second RLC/MAC control circuit 38 with its memory controller 46, the system memory 48 and the downstream LLC block 45 are integrated into a baseband control unit 50.

Figure 1:
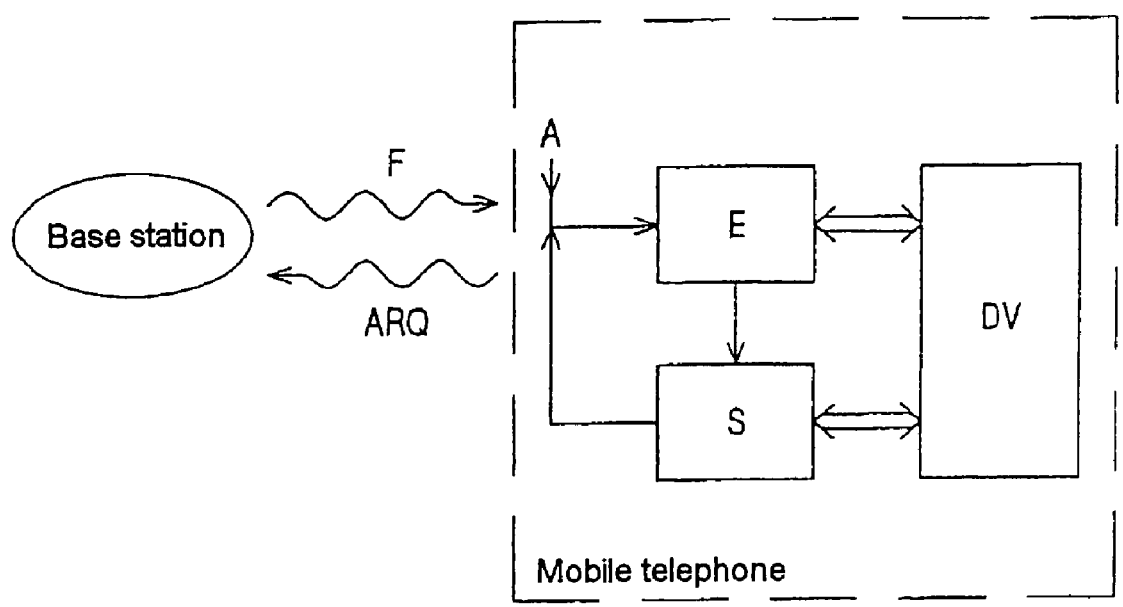
FIG. 1 shows a schematic diagram of a mobile telephone with a receiver according to the prior art.
Figure 2:
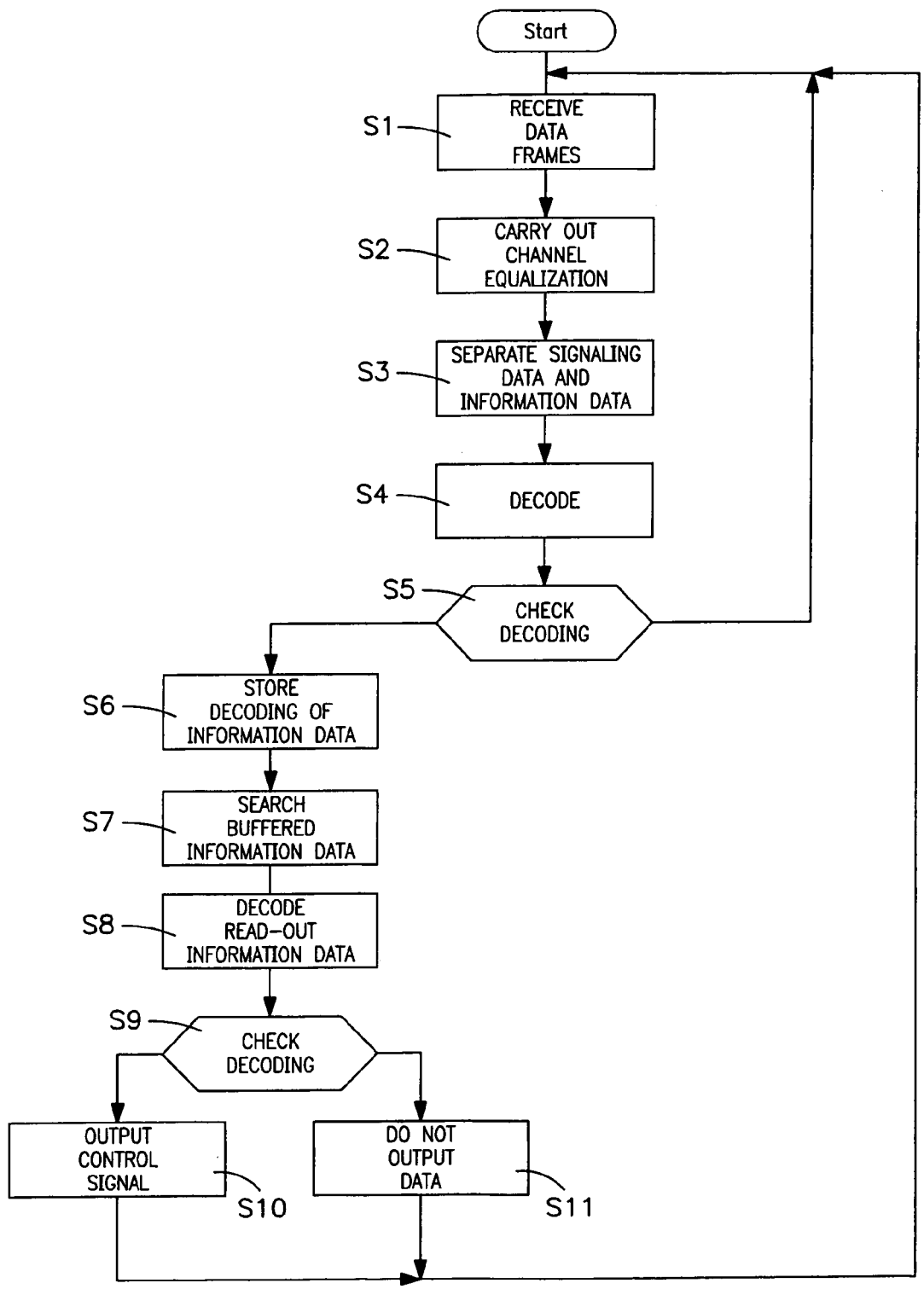
FIG. 2 shows an ARQ2 method for EGPRS receivers according to the prior art.
Figure 3:
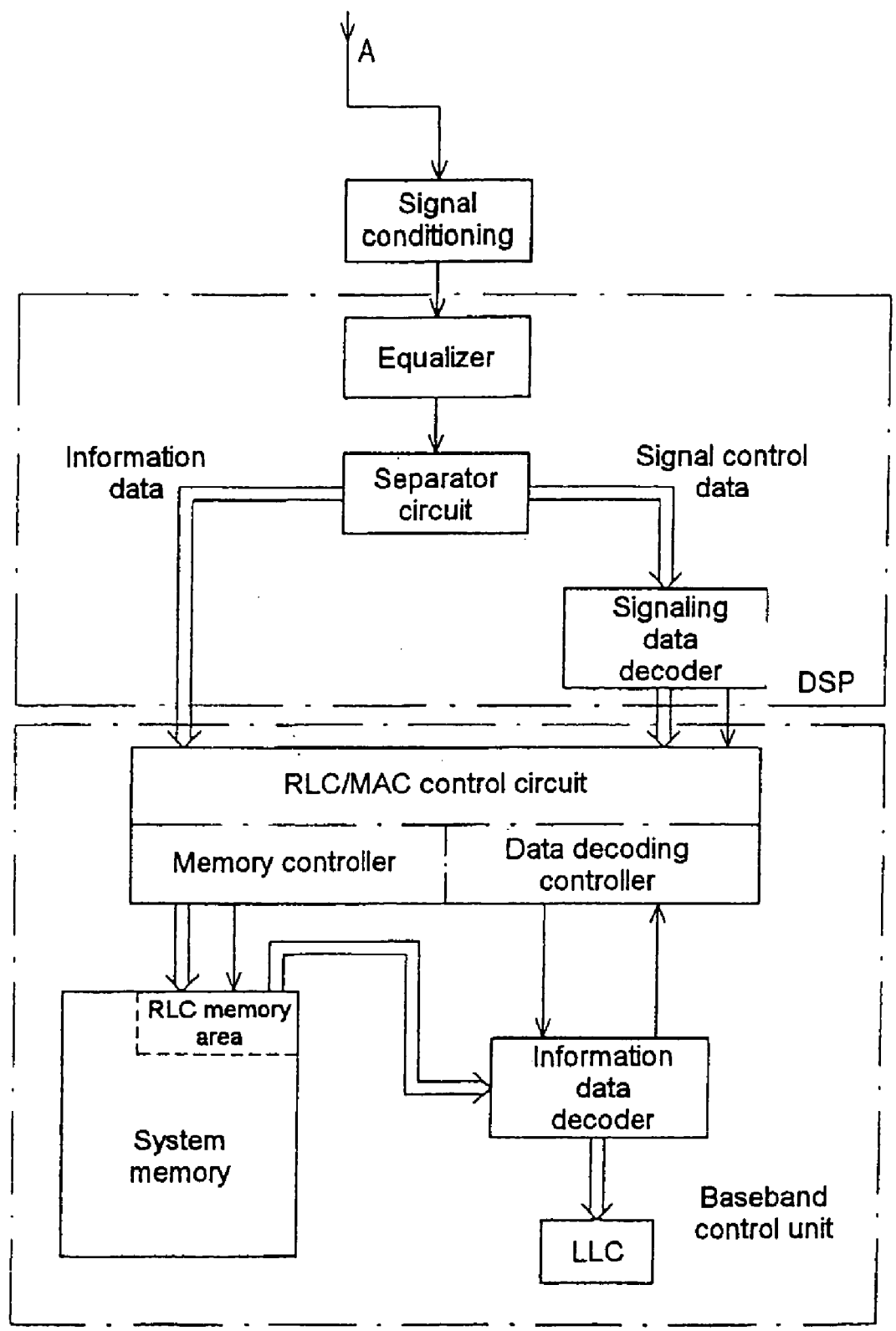
FIG. 3 shows a block circuit diagram of a receiver for receiving data frames according to the prior art.

As becomes apparent by comparing the conventional receiver, such as is illustrated in FIG. 3, and the first embodiment of the receiver 1 according to the invention, as is illustrated in FIG. 4, the receiver 1 according to the invention requires only one channel decoding circuit 35 which is used both for decoding the signaling data and for decoding the information data. Here, the channel decoding circuit 35 can be switched over between a first operating mode for decoding signaling data into a second operating mode for decoding information data. Firstly, the decoding of the signaling data which also contains in decoded form the decoding instruction for the decoding of the associated information data is carried out. The decoding instruction, acquired during the decoding of the signaling data, for the decoding of the associated information data is then used by the channel decoding circuit 35 to decode the information data. The decoding of the received data frames is thus carried out in a receiver according to the invention by means of a single channel decoding circuit 35 in two successive decoding steps. As the receiver 1 according to the invention only contains one channel decoding circuit 35, which decodes both the signaling data and the information data of a received data frame, the expenditure in terms of circuitry is low in comparison with the conventional receiver such as is illustrated in FIG. 3.

Figure 5:
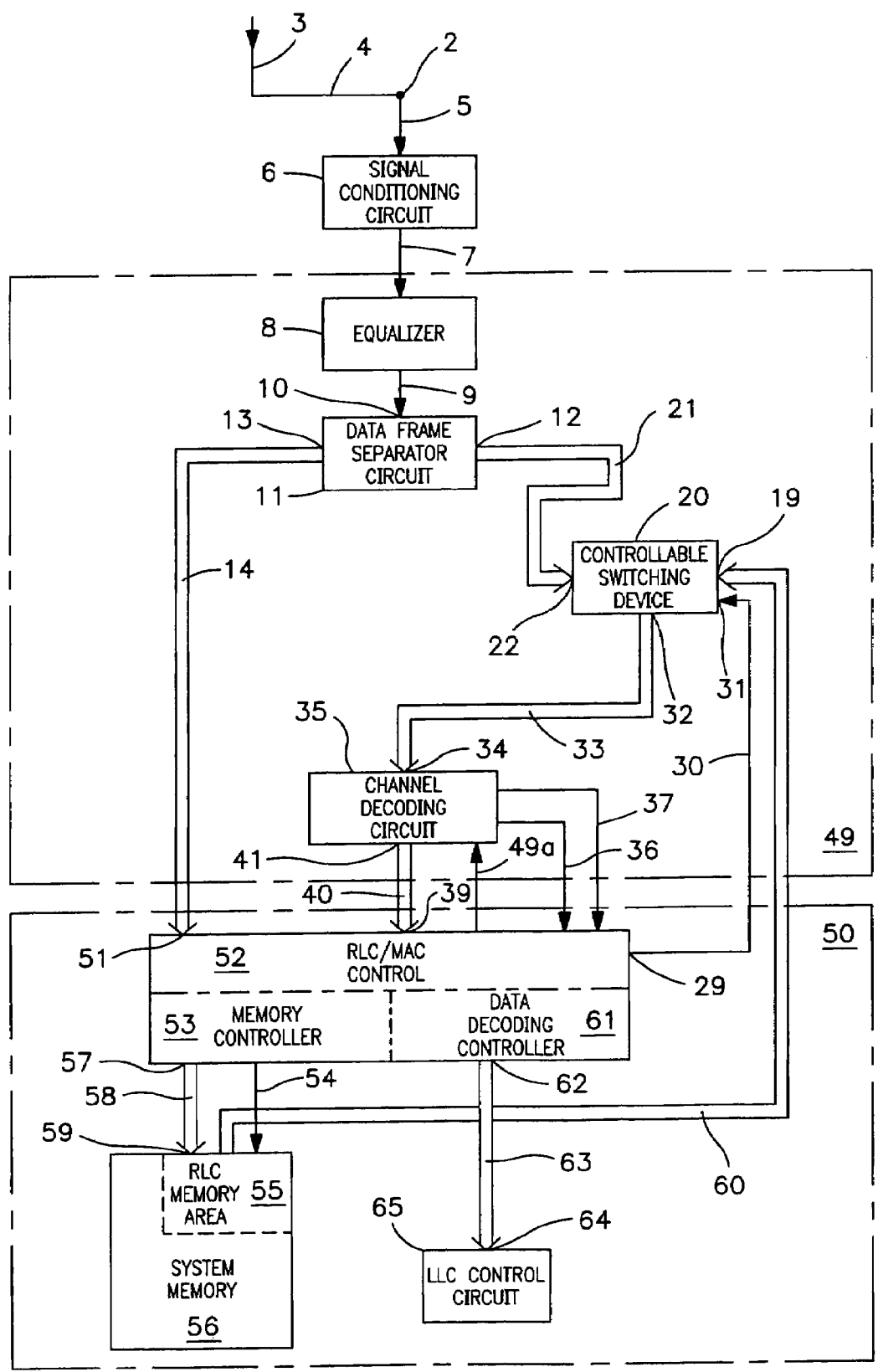
FIG. 5 shows a second preferred embodiment of the receiver according to the invention.

FIG. 5 shows a second, particularly preferred embodiment of the receiver 1 according to the invention for receiving data frames. The receiver 1 according to the second embodiment which is illustrated in FIG. 5 has, like the first embodiment which has been illustrated in FIG. 4, a signal conditioning circuit 6, an equalizer 8 and a data frame separator circuit 11. In the second preferred embodiment illustrated in FIG. 5, the signaling data is fed from the data output 12 of the data frame separator circuit 11 via data lines 21 to a data input 22 of a controllable switching device 20. In the second embodiment of the receiver 1 according to the invention, the information data which is output to the second data output 13 of the data frame separator circuit 11 is output directly to a data input 51 of an RLC/MAC control circuit 52 within the baseband control unit 50 via data lines 14. The RLC/MAC control circuit 52 has a further data input 39 which, as in the first embodiment, is connected to the data output 41 of the channel decoding circuit 35. The RLC/MAC control circuit 52 controls the switchable control unit 20 within the DSP processor 49 via a control line 30. Furthermore, the RLC/MAC control circuit 52 receives, via a signaling line 36, a first indicator signal which indicates the error-free decoding of the signaling data by the channel decoding circuit 35 and, via a signaling line 37, a second indicator signal which indicates the error-free decoding of information data by the channel decoding circuit 35. The RLC/MAC control circuit 52 contains a memory controller 53 which controls, via control lines 54, the writing in and the reading out of information data into a dynamically addressable memory area 55 of a system memory 56 of the baseband control unit 50. The RLC/MAC control circuit 52 also has a data output 57 which is connected via data lines 58 to a data input and output 59 of the system memory 56. The data input and output 59 of the system memory 56 is also connected via data lines 60 to the data input 19 of the switchable control circuit 20.

The RLC/MAC control circuit 52 contains a data decoding controller 57 which controls the decoding of data by the channel decoding circuit 35 via the control line 49.

The RLC/MAC control circuit 52 has a data output 62 via which the decoded information data which is present at the data input 39 can be passed on via data lines 63 to a data input 64 of a downstream LLC block 65 for further data processing.

The method of operation of the preferred embodiment of the receiver 1 according to the invention which is illustrated in FIG. 5 will be explained below. Firstly, the controllable switching device 20 is driven by means of the RLC/MAC control circuit 52 via the control line 30 in such a way that the signaling data which is present at the signal input 22 is connected through to the channel decoding circuit 35. The RLC/MAC control circuit 52 signals to the channel decoding circuit 35, via the control line 49, that signaling data corresponding to a predefined decoding instruction is to be executed for signaling data. The channel decoding circuit 35 carries out the decoding of the signaling data—present at the data input 34—in accordance with the decoding instruction and then checks, by means of redundant signaling data, whether or not the decoding of the signaling data has been carried out without error. The channel decoding circuit 35 outputs a corresponding indicator signal to the RLC/MAC control circuit 52 via the indicator line 36. If the received indicator signal indicates that the decoding of the signaling data has taken place without error, the associated information data which is present at the data input 51 of the RLC/MAC control circuit 52 is written, in a dynamically addressed fashion, into the RLC memory area 55 of the system memory 56 by the memory controller 53 via the data lines 58. In addition, the RLC/MAC control circuit 52 outputs a control signal to the switching device 20 via the control line 30, by which signal the other data input 19 is connected through to the data output 32 of the control circuit. The memory controller 53 searches, in the RLC memory area 55, through all the buffered information data which is associated with a data frame with the same data frame identifier and reads out this information data to the data input 19 of the switching device 20 via the data input and output 59 of the system memory 56 via the data lines 60. Then, the channel decoding circuit 35 carries out decoding over all the information data which is read out from the memory 56 and which is associated with a data frame with the same data frame identifier, and checks, by reference to redundant data, whether or not the decoding of the information data has been carried out without error. Via the signaling line 37, the channel decoding circuit 35 outputs an indicator signal to the RLC/MAC control circuit 52 which indicates whether or not the decoding of the information data has taken place without error.

If the indicator signal indicates that the decoding of the information data has been carried out without error by the channel decoding circuit 35, the RLC/MAC control circuit 52 outputs the decoded information data which is present at the data input 39 to the downstream LLC circuit 65 via the data output 62 for further data processing. At the same time, the memory controller 53 clears the associated, successfully decoded information data in the RLC memory area 55 of the system memory 56.

If, conversely, the indicator signal which is present on the signaling line 37 indicates that the decoding of the information data by the channel decoding circuit 35 has not been carried out without error, the associated information data in the memory area 55 is not cleared and the information data which is present at the data input 39 and has been decoded in an errored fashion is rejected by the RLC/MAC control circuit 52 or not passed on to the downstream LLC block 65. In addition, the RLC/MAC control circuit 52 outputs a control signal to a transmitter of the receiver according to the invention, which receiver sends off a request signal to the base station to request renewed transmission of the data frame which has been decoded in an errored fashion.

The second embodiment of the receiver 1 according to the invention which is illustrated in FIG. 5 has, in comparison with the first embodiment illustrated in FIG. 4, the advantage that it is not necessary to provide a buffer 16 in the DSP processor 49. In the preferred embodiment illustrated in FIG. 5, the buffering is carried out in the system memory 56, which is present in any case, of the baseband control unit 50. As further assemblies have access to the system memory 56 of the baseband control unit 50, the RLC memory area 55 can also be used for further applications.

A further advantage of the second embodiment which is illustrated in FIG. 5 is that this embodiment has only one RLC/MAC control circuit 52 which is contained in the baseband control unit 50. The RLC/MAC control circuit 27 which is contained in the DSP processor 49 in the first embodiment illustrated in FIG. 4 is no longer required in the second embodiment illustrated in FIG. 5 so that the expenditure in terms of circuitry is lower overall in the second embodiment.

The receivers which are illustrated in the two FIGS. 4, 5 are used to receive data frames which are transmitted via a mobile radio link. However, the receiver 1 according to the invention can also be used in applications in which the data frames are transmitted to the signal input 2 of the receiver 1 via a fixed signal line.

| List of reference numberals | |
|---|---|
| 1 | Receiver |
| 2 | Signal input |
| 3 | Antenna |
| 4 | Signal line |
| 5 | Line |
| 6 | Signal conditioning circuit |
| 7 | Line |
| 8 | Equalizer |
| 9 | Line |
| 10 | Data input |
| 11 | Data frame separator circuit |
| 12 | Data output |
| 13 | Data output |
| 14 | Data lines |
| 15 | Data input |
| 16 | Buffer |
| 17 | Data output |
| 18 | Data lines |
| 19 | Data input |
| 20 | Switching device |
| 21 | Data lines |
| 22 | Data input |
| 23 | Control input |
| 24 | Control line |
| 25 | Control output |
| 26 | Memory controller |
| 27 | RLC/MAC control circuit |
| 28 | Data decoding controller |
| 29 | Control output |

| -continued | |
|---|---|
| List of reference numberals | |
| 30 | Control line |
| 31 | Control output |
| 32 | Data output |
| 33 | Data line |
| 34 | Data input |
| 35 | Channel decoding circuit |
| 36 | Indicator line |
| 37 | Indicator line |
| 38 | RLC/MAC control circuit |
| 39 | Data input |
| 40 | Data lines |
| 41 | Data output |
| 42 | Data output |
| 43 | Data lines |
| 44 | Data input |
| 45 | LLC circuit |
| 46 | Memory controller |
| 47 | Data control lines |
| 48 | System memory |
| 49 | DSP processor |
| 49a | Control line |
| 50 | Baseband control unit |
| 51 | Data input |
| 52 | RLC/MAC control circuit |
| 53 | Memory Controller |
| 54 | Controller line |
| 55 | RLC memory area |
| 56 | System memory |
| 57 | Data output |
| 58 | Data line |
| 59 | Memory data input and output |
| 60 | Data lines |
| 61 | Data decoding controller |
| 62 | Data output |
| 63 | Data lines |
| 64 | Data input |
| 65 | LLC circuit |

The invention claimed is:

1. A receiver for receiving data frames which contain information data and signaling data, the signaling data comprising a data frame identifier and a decoding instruction for decoding the information data, having:
(a) a signal input for receiving said data frames which are transmitted on a transmission channel,
(b) a data frame separator circuit for separating said data frames into the signaling data and the information data, and
(c) a controllable switching device which, as a function of a control signal, connects the signaling data present at a first data input of the switching device or the information data present at a second data input of the switching device to a data output of the switching device;
(d) a channel decoding circuit, connected to the data output of the switching device, for decoding the data which is present, the channel decoding circuit generating indicator signals which indicate whether the decoding of the data which is present has been carried out without error by the channel decoding circuit; and
(e) a control circuit wherein the control circuit comprises a first control unit which is integrated into a digital signal processor, and of a second control unit which is integrated into a baseband control unit, when a first indicator signal which is generated by the channel decoding circuit indicates an error-free decoding of the signaling data of a data frame is received, the control circuit buffers the information data, the decoding instruction for decoding the information data and the data frame identifier, and the first control unit outputs the control signal to the switching device in order to connect the buffered information data to the channel decoding circuit, when a second indicator signal which is generated by the channel decoding circuit indicates an error-free decoding of the information data by the channel decoding circuit is received, the second control unit outputs the decoded information data to a logic link control circuit which is integrated into the baseband control circuit.

2. The receiver according to claim 1, wherein the data frames are received over a mobile radio link.

3. The receiver according to claim 1, wherein the signal input is connected to a reception antenna for receiving the transmitted data frames.

4. The receiver according to claim 1, wherein the data frames are transmitted with analog modulation.

5. The receiver according to claim 3, wherein an RF demodulator for demodulating the received data frames into demodulated data frames is connected to the reception antenna.

6. The receiver according to claim 5, wherein the RE demodulator is a PSK demodulator.

7. The receiver according to claim 5, wherein an analog bandpass filter bank for frequency band selection is connected downstream of the RF demodulator.

8. The receiver according to claim 7, wherein an analog/digital converter for converting the demodulated data frames into digital data frames is connected downstream of the analog bandpass filter bank.

9. The receiver according to claim 8, wherein an equalizer for equalizing the data which is transmitted on the transmission channel is connected downstream of the analog/digital converter.

10. The receiver according to claim 9, wherein the data frame separator circuit for separating said data frames into the signaling data and the information data is connected downstream of the equalizer.

11. The receiver according to claim 1, wherein the data frame separator circuit has a first data output for outputting the signaling data and a second data output for outputting the information data.

12. The receiver according to claim 11, wherein the control circuit buffers the information data in a buffer, and wherein the buffer is provided at the second data output of the data frame separator circuit.

13. The receiver according to claim 12, wherein the buffer is connected to the second data input of the controllable switching device.

14. The receiver according to claim 11, wherein the first data output of the data frame separator circuit is connected to the first data input of the controllable switching device.

15. The receiver according to claim 9, wherein the equalizer, the data frame separator circuit, the controllable switching device and the channel decoding circuit are integrated into the digital signal processor.

16. The receiver according to claim 12, wherein the buffer is integrated into the digital signal processor.

17. The receiver according to claim 16, wherein the first control unit which is integrated into the digital signal processor has a memory controller for driving the buffer.

18. The receiver according to claim 1, wherein the control signal is a first control signal, and wherein the channel decoding circuit decodes, as a function of a second control signal received by the control circuit, the data which is present, in accordance with a first decoding instruction for decoding signaling data, or in accordance with a second decoding instruction for decoding information data.

19. The receiver according to claim 1, wherein the channel decoding circuit receives the decoding instruction from the control circuit via control lines.

20. The receiver according to claim 1, wherein the receiver is an Enhanced General Packet Radio Service receiver.

21. The receiver according to claim 1, wherein the receiver is installed in a mobile telephone.

22. The receiver according to claim 1, wherein the signal input is connected to a signal line in order to receive the transmitted data frames.

* * * * *